United States Patent
Yasuda (10) Patent No.: US 6,864,499 B2
(45) Date of Patent: Mar. 8, 2005

(54) RADIATION IMAGE READ-OUT METHOD AND APPARATUS

(75) Inventor: Hiroaki Yasuda, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 182 days.

(21) Appl. No.: 10/194,050

(22) Filed: Jul. 15, 2002

(65) Prior Publication Data

US 2003/0010944 A1 Jan. 16, 2003

(30) Foreign Application Priority Data

Jul. 13, 2001 (JP) ........................................ 2001-213057

(51) Int. Cl.[7] .............................................. G03B 42/08
(52) U.S. Cl. ...................................................... 250/589
(58) Field of Search ........................................ 250/589

(56) References Cited

U.S. PATENT DOCUMENTS

| | | |
|---|---|---|
| 4,258,264 A | 3/1981 | Kotera et al. |
| 4,346,295 A | 8/1982 | Tanaka et al. |
| 4,485,302 A | 11/1984 | Tanaka et al. |
| 6,365,909 B1 * | 4/2002 | Hayakawa et al. ......... 250/584 |

FOREIGN PATENT DOCUMENTS

| | | | | |
|---|---|---|---|---|
| JP | 55-12429 A | | 1/1980 | |
| JP | 56-11397 A | | 2/1982 | |
| JP | 63-121834 A | * | 5/1988 | ........... G03B/42/02 |
| JP | 56-11395 A | | 2/1991 | |
| JP | 4-42222 A | * | 2/1992 | ........... G03B/42/02 |

* cited by examiner

*Primary Examiner*—Constantine Hannaher
(74) *Attorney, Agent, or Firm*—Sughrue Mion, PLLC

(57) ABSTRACT

Stimulating light is projected by a stimulating light projector onto the stimulable phosphor sheet to expose a linear portion of the stimulable phosphor sheet extending in a main scanning direction to the stimulating light and stimulated emission emitted from the stimulable phosphor sheet upon exposure to the stimulating light is detected by a line sensor extending in the main scanning direction with an imaging optical system intervening between the stimulable phosphor sheet and the line sensor or with the line sensor held in the vicinity of the stimulable phosphor sheet. The stimulable phosphor sheet is fixed in a read-out position, and the radiation image is read out while the stimulating light projector and the line sensor are being moved relatively to the fixed stimulable phosphor sheet in a sub-scanning direction intersecting the main scanning direction.

7 Claims, 4 Drawing Sheets

RADIATION IMAGE READ-OUT METHOD AND APPARATUS

BACKGROUND OF THE INVENTION

1. Field of the Invention

This invention relates to a radiation image read-out method and a radiation image read-out apparatus, and more particularly to a radiation image read-out method and a radiation image read-out apparatus for reading out a radiation image stored on a stimulable phosphor sheet by the use of a line sensor.

2. Description of the Related Art

When certain kinds of phosphor are exposed to a radiation such as X-rays, α-rays, β-rays, γ-rays, electron beams, ultraviolet rays and the like, they store a part of energy of the radiation. Then when the phosphor which has been exposed to the radiation is exposed to stimulating rays such as visible light, light is emitted from the phosphor in proportion to the stored energy of the radiation. A phosphor exhibiting such properties is generally referred to as "a stimulable phosphor". In this specification, the light emitted from the stimulable phosphor upon stimulation thereof will be referred to as "stimulated emission". There has been known a radiation image recording and reproducing system in which a stimulating light beam such as a laser beam is projected onto a stimulable phosphor sheet (a sheet provided with a layer of the stimulable phosphor) which has been exposed to a radiation passing through an object such as a human body to have a radiation image of the object stored on the stimulable phosphor sheet, and the stimulated emission emitted from the stimulable phosphor sheet is photoelectrically detected, thereby obtaining an image signal (a radiation image signal) representing a radiation image of the object. See, for instance, Japanese Unexamined Patent Publication Nos. 55(1980)-12429, 56(1981)-11395 and 56(1981)-11397.

As the apparatus used for reading out the radiation image signal, there have been known those of various structures. For example, there has been known an apparatus in which a stimulable phosphor sheet contained in a cassette is taken out from the cassette and is placed on a conveyor belt, stimulating light is projected onto the stimulable phosphor sheet while it is being conveyed by the conveyor belt and stimulated emission emitted from each part of the stimulable phosphor sheet upon exposure to the stimulating light is detected.

As a system for detecting stimulated emission emitted from the stimulable phosphor sheet, there have been known a system in which stimulated emission imaged on a line sensor by an imaging optical system is detected by the line sensor, and a system in which stimulated emission is detected by a line sensor held in the vicinity of the stimulable phosphor sheet, thereby obtaining information on the position of the stimulable phosphor sheet from which the stimulated emission is emitted and information on the intensity of the stimulated emission and the reading out a radiation image recorded on the stimulable phosphor sheet.

In the latter system, a line sensor having a plurality of photoelectric convertor elements arranged in a row is held in the vicinity of or in contact with the stimulable phosphor sheet and is caused to directly detects the stimulated emission emitted from the stimulable phosphor sheet. In the former system, the imaging optical system may be any optical system so long as it can form on the line sensor an image of the surface of the stimulable phosphor sheet from which the stimulated emission is emitted. For example, the imaging optical system need not be an optical system in which an image of the surface of the stimulable phosphor sheet is formed on the line sensor by the action of the lens but may be those in which an image of the surface of the stimulable phosphor sheet is formed on the line sensor by leading the stimulated emission to the line sensor by way of image fibers.

In either system, a radiation image is read out from the stimulable phosphor sheet by leading the stimulated emission emitted from a particular area on the stimulable phosphor sheet to a corresponding photoelectric convertor element of the line sensor.

However, when a radiation image recorded on a stimulable phosphor sheet is to be read out by the use of a line sensor, the distance between the stimulable phosphor sheet and the imaging optical system or the distance between the stimulable phosphor sheet and the line sensor greatly affects the quality of the radiation image.

For example, in the case where an image of the area of the stimulable phosphor sheet emitting the stimulated emission is formed on the line sensor by an imaging optical system, the image can come out of focus and the image signal representing a radiation image read out from the stimulable phosphor sheet can be deteriorated in S/N when the distance between the stimulable phosphor sheet and the imaging optical system (will be referred to as "the detecting space", hereinbelow.) fluctuates. Similarly, in the case where the stimulated emission emitted from the stimulable phosphor sheet is directly detected by the line sensor without an imaging optical system, fluctuation in the detecting space (i.e., the distance between the stimulable phosphor sheet and the line sensor in this case) changes the amount of stimulated emission which enters each photoelectric convertor element of the line sensor from the corresponding area of the stimulable phosphor sheet and the proportion of the amount of stimulated emission which enters each photoelectric convertor element of the line sensor from the area of the stimulable phosphor sheet not corresponding to the photoelectric convertor element to that of stimulated emission which enters each photoelectric convertor element of the line sensor from the corresponding area of the stimulable phosphor sheet. That is, as the detecting space becomes smaller, the amount of stimulated emission which enters each photoelectric convertor element of the line sensor from the corresponding area of the stimulable phosphor sheet increases and the proportion of the amount of stimulated emission which enters each photoelectric convertor element of the line sensor from the area of the stimulable phosphor sheet not corresponding to the photoelectric convertor element to that of stimulated emission which enters each photoelectric convertor element of the line sensor from the corresponding area of the stimulable phosphor sheet increases, whereby the image signal read out becomes higher in S/N, whereas as the detecting space becomes larger, the amount of stimulated emission which enters each photoelectric convertor element of the line sensor from the corresponding area of the stimulable phosphor sheet decreases and the proportion of the amount of stimulated emission which enters each photoelectric convertor element of the line sensor from the area of the stimulable phosphor sheet not corresponding to the photoelectric convertor element to that of stimulated emission which enters each photoelectric convertor element of the line sensor from the corresponding area of the stimulable phosphor sheet decreases, whereby the image signal read out becomes lower in S/N, which can result in fluctuation of image quality from area to area due to fluctuation in the amount of stimulated emission received by each photoelectric convertor element and/or the S/N.

However, since the detecting space has been conventionally fluctuated due to distortion of the stimulable phosphor sheet and/or errors in conveying the stimulable phosphor sheet, there has been a demand for suppressing fluctuation in the detecting space as small as possible.

SUMMARY OF THE INVENTION

In view of the foregoing observations and description, the primary object of the present invention is to provide a radiation image read-out method and a radiation image read-out apparatus which can meet the demand, that is, which can suppress fluctuation in the detecting space.

In accordance with a first aspect of the present invention, there is provided a radiation image read-out method of reading out a radiation image recorded on a stimulable phosphor sheet in which stimulating light is projected by a stimulating light projecting means onto the stimulable phosphor sheet to expose a linear portion of the stimulable phosphor sheet extending in a main scanning direction to the stimulating light and stimulated emission emitted from the stimulable phosphor sheet upon exposure to the stimulating light is detected by a line sensor extending in the main scanning direction with an imaging optical system intervening between the stimulable phosphor sheet and the line sensor or with the line sensor held in the vicinity of the stimulable phosphor sheet, wherein the improvement comprises that the stimulable phosphor sheet is fixed in a read-out position, and said radiation image is read out while the stimulating light projecting means and the line sensor are being moved relatively to the fixed stimulable phosphor sheet in a sub-scanning direction intersecting the main scanning direction.

In accordance with a second aspect of the present invention, there is provided a radiation image read-out method of reading out a radiation image recorded on a stimulable phosphor sheet in which stimulating light is projected by a stimulating light projecting means onto the stimulable phosphor sheet to expose a linear portion of the stimulable phosphor sheet extending in a main scanning direction to the stimulating light and stimulated emission emitted from the stimulable phosphor sheet upon exposure to the stimulating light is detected by a line sensor extending in the main scanning direction with an imaging optical system intervening between the stimulable phosphor sheet and the line sensor or with the line sensor held in the vicinity of the stimulable phosphor sheet, wherein the improvement comprises that the stimulable phosphor sheet is located in the direction of its thickness by the use of one side thereof, and projection of the stimulating light onto the stimulable phosphor sheet, detection of the stimulated emission by the line sensor, and projection of erasing light for erasing the residual energy of the radiation in the stimulable phosphor sheet onto the stimulable phosphor sheet are carried out from the other side of the stimulable phosphor sheet.

In accordance with a third aspect of the present invention, there is provided a radiation image read-out apparatus for carrying out the method of the first aspect, that is, a radiation image read-out apparatus for reading out a radiation image recorded on a stimulable phosphor sheet comprising a stimulating light projecting means which projects stimulating light onto the stimulable phosphor sheet to expose a linear portion of the stimulable phosphor sheet extending in a main scanning direction to the stimulating light and a line sensor which extends in the main scanning direction and detects stimulated emission emitted from the stimulable phosphor sheet upon exposure to the stimulating light with an imaging optical system intervening between the stimulable phosphor sheet and the line sensor or with the line sensor held in the vicinity of the stimulable phosphor sheet, wherein the improvement comprises a fixing means which fixes the stimulable phosphor sheet in a read-out position, and a moving means which moves the stimulating light projecting means and the line sensor relatively to the fixed stimulable phosphor sheet in a sub-scanning direction intersecting the main scanning direction.

For example, the fixing means fixes the stimulable phosphor sheet in the read-out position so that the stimulable phosphor sheet is directed substantially vertically.

In accordance with a fourth aspect of the present invention, there is provided a radiation image read-out apparatus for carrying out the method of the second aspect, that is, a radiation image read-out apparatus for reading out a radiation image recorded on a stimulable phosphor sheet comprising a stimulating light projecting means which projects stimulating light onto the stimulable phosphor sheet to expose a linear portion of the stimulable phosphor sheet extending in a main scanning direction to the stimulating light and a line sensor which extends in the main scanning direction and detects stimulated emission emitted from the stimulable phosphor sheet upon exposure to the stimulating light with an imaging optical system intervening between the stimulable phosphor sheet and the line sensor or with the line sensor held in the vicinity of the stimulable phosphor sheet, wherein the improvement comprises an erasing light projecting means which projects erasing light for erasing the residual energy of the radiation in the stimulable phosphor sheet onto the stimulable phosphor sheet, and a stimulable phosphor sheet locating means which locates the stimulable phosphor sheet in the direction of its thickness by the use of one side thereof, the stimulating light projecting means, the line sensor and the erasing light projecting means being arranged to respectively carry out projection of the stimulating light onto the stimulable phosphor sheet, detection of the stimulated emission, and projection of erasing light onto the stimulable phosphor sheet from the other side of the stimulable phosphor sheet.

For example, the stimulable phosphor sheet locating means locates the stimulable phosphor sheet so that the stimulable phosphor sheet is directed substantially vertically.

It is preferred that the stimulable phosphor sheet comprises a rigid support member.

The stimulable phosphor sheet may be housed in a cassette so that the stimulable phosphor sheet is taken out when a radiation image recorded thereon is to be read out and the support member may double as a part of the cassette.

For example, the rigid support member may be formed of carbon, glass or hard resin.

In accordance with the method of the first aspect of the present invention and the apparatus of the third aspect of the present invention, since the stimulating light projecting means and the line sensor which can be higher in rigidity than the stimulable phosphor sheet are moved with the stimulable phosphor sheet held stationary, fluctuation in the detecting space can be suppressed as compared with the conventional system where the stimulable phosphor sheet is moved relatively to the line sensor by conveying the stimulable phosphor sheet by a conveyor belt, whereby deterioration of quality of the radiation image read out from the stimulable phosphor sheet can be suppressed.

When the fixing means is arranged to fix the stimulable phosphor sheet in the read-out position so that the stimulable phosphor sheet is directed substantially vertically, deflection of the stimulable phosphor sheet as fixed in the read-out position can be smaller.

In accordance with the method of the second aspect of the present invention and the apparatus of the fourth aspect of the present invention, since the stimulable phosphor sheet locating means locates the stimulable phosphor sheet in the direction of its thickness by the use of one side thereof, and projection of the stimulating light onto the stimulable phosphor sheet, detection of the stimulated emission, and projection of erasing light onto the stimulable phosphor sheet are carried out from the other side of the stimulable phosphor sheet, said one side of the stimulable phosphor sheet can be used entirely for locating the stimulable phosphor sheet in the direction of its thickness without limited by the read-out action or the erasing action and accordingly the degree of freedom in locating the stimulable phosphor sheet in the direction of its thickness is increased, for instance, the entire area of said one side of the stimulable phosphor sheet can be used for locating the stimulable phosphor sheet. This makes it feasible to locate the stimulable phosphor sheet in the read-out position so that deformation and/or deflection of the stimulable phosphor sheet is corrected and flatness of the surface of the stimulable phosphor sheet is improved, whereby fluctuation in the detecting space can be suppressed as compared with the conventional system and deterioration of quality of the radiation image read out from the stimulable phosphor sheet can be suppressed.

When the stimulable phosphor sheet locating means is arranged to locate the stimulable phosphor sheet so that the stimulable phosphor sheet is directed substantially vertically, deflection of the stimulable phosphor sheet can be smaller.

Further, when the stimulable phosphor sheet comprises a rigid support member, deformation and/or deflection of the stimulable phosphor sheet can be suppressed, which result in suppression of fluctuation of the detecting space.

Even if the stimulable phosphor sheet is housed in a cassette and the stimulable phosphor sheet is taken out when a radiation image recorded thereon is to be readout, deformation of the stimulable phosphor sheet generated when the stimulable phosphor sheet is taken out from the cassette can be corrected, whereby fluctuation of the detecting space can be suppressed.

Further when the support member doubles as a part of the cassette, the rigidity of the stimulable phosphor sheet can be increased at low cost.

DESCRIPTION OF THE PREFERRED EMBODIMENT

Figure 1:
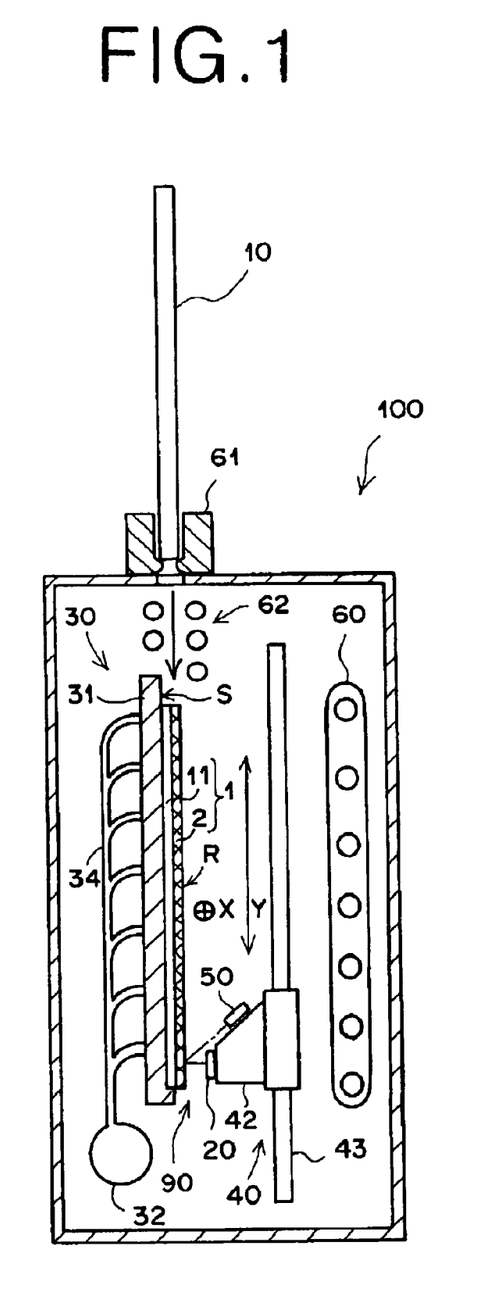
FIG. 1 is a cross-sectional view schematically showing a radiation image read-out apparatus in accordance with a first embodiment of the present invention.

As shown in FIG. 1, a radiation image read-out apparatus 100 in accordance with a first embodiment of the present invention comprises a stimulating light projecting means 50 which projects stimulating light onto a stimulable phosphor sheet 1 taken out from a cassette 10 to expose a linear portion of the stimulable phosphor sheet extending in a main scanning direction (the direction of arrow X perpendicular to the sheet surface in FIG. 1) to the stimulating light, and a read-out means 90 which reads out a radiation image recorded on the stimulable phosphor sheet 1. The read-out means 90 comprises a line sensor 20 which extends in the main scanning direction and detects stimulated emission emitted from the stimulable phosphor sheet 1 upon exposure to the stimulating light with the line sensor 20 held in the vicinity of the stimulable phosphor sheet 1. The radiation image read-out apparatus 100 further comprises a sheet fixing means 30 which fixes the stimulable phosphor sheet 1 in a read-out position, and a moving means 40 which moves the stimulating light projecting means 50 and the line sensor 20 relatively to the fixed stimulable phosphor sheet 1 in a sub-scanning direction (the vertical direction in FIG. 1, or the direction arrow Y) intersecting the main scanning direction.

Figure 2:
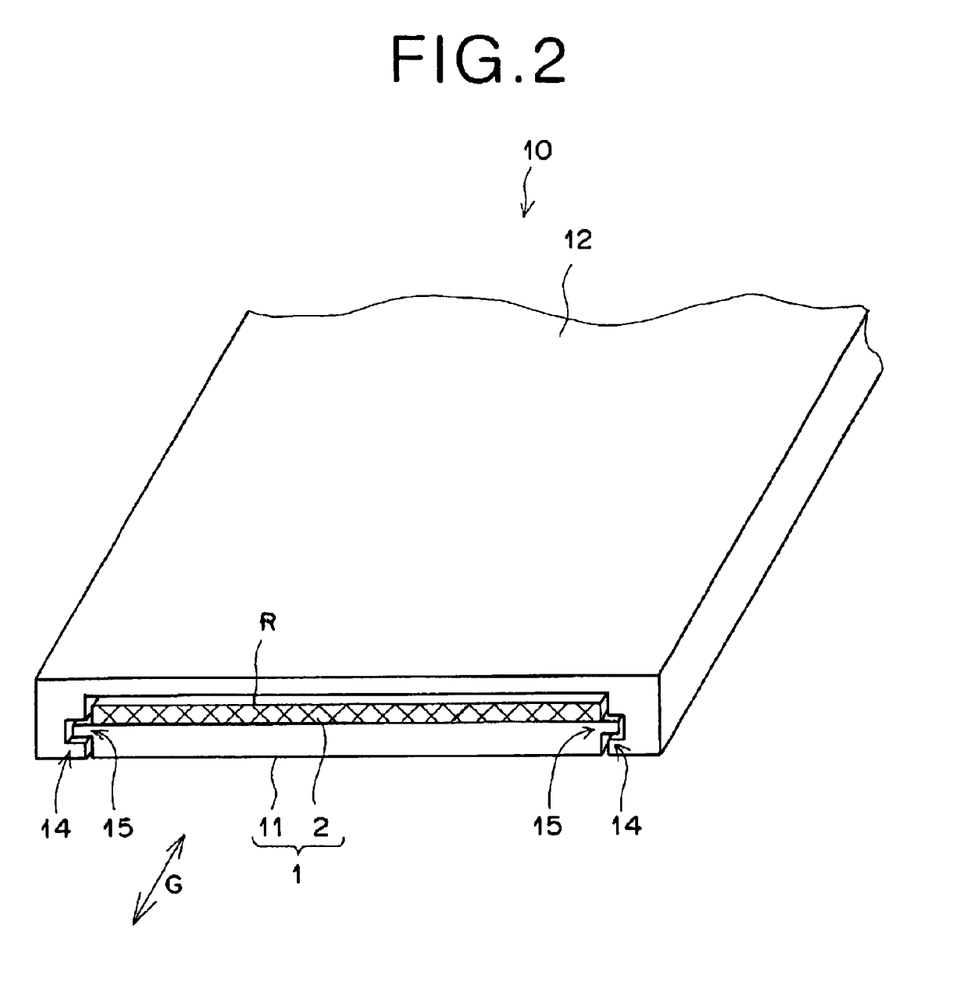
FIG. 2 is a fragmentary cross-sectional view showing a cassette.

As shown in FIG. 2, the stimulable phosphor sheet 1 comprises a support plate 11 which is high in rigidity and forms the bottom plate of the cassette 10 and a stimulable phosphor layer 2 formed on the support plate 11. The detecting surface R of the stimulable phosphor layer 2 from which the stimulated emission is detected is high in flatness.

The cassette 10 comprises a cover 12 in which the support plate 11 of the stimulable phosphor sheet 1 is received to be slidable in and out. That is, the support plate 11 has opposite edges 15 projecting beyond the side edges of the stimulable phosphor layer 2 and the projecting edges 15 of the support plate 11 is received in guide grooves 14 formed in inner side surfaces of the cover 12 to be slidable back and forth in the direction of arrow G.

The line sensor 20 comprises a plurality of photoelectric convertor elements arranged in a row in the main scanning direction. Each photoelectric convertor element has a substantially square light receiving face about 100 $\mu$m in the length of each side.

The sheet fixing means 30 comprises a fixing table 31 to which the stimulable phosphor sheet 1 is fixed to be directed substantially vertically and a suction pump 32 for fixing the stimulable phosphor sheet 1 to the fixing table 31. That is, a plurality of suction holes (not shown) are formed through the fixing table 31 and are connected to the suction pump 32 by way of an air passage 34 at a side of the fixing table 31 opposite to the fixing surface S on which the stimulable phosphor sheet 1 is fixed. The support plate 11 of the stimulable phosphor sheet 1 is fixed to the fixing surface S of the fixing table 31 under suction force provided to the suction holes from the suction pump 32. Since the support plate 11 is high in rigidity, the support plate 11 is hardly deformed by the suction force.

The moving means 40 comprises a movable table 42 on which the line sensor 20 and the stimulating light projecting means 50 are amounted and a guide rail 43 extending in parallel to the fixing surface S of the fixing table 31, and the movable table 42 is moved in the sub-scanning direction under the guidance of the guide rail 43 driven by a drive means (not shown) which may comprise a ball screw.

The stimulating light projecting means 50 comprises a broad area laser which emits a stimulating laser beam and an optical system which converges the stimulating laser beam emitted from the broad area laser in a linear area and projects the stimulating laser beam in a linear area of the stimulable phosphor sheet extending the main scanning direction.

The radiation image read-out apparatus 100 of this embodiment further comprises an erasing light projecting means 60 which has a plurality of erasing light sources (fluorescent lamps) and projects erasing light for erasing residual radiation image information onto the stimulable phosphor sheet 1 after the radiation image recorded thereon is read out, a cassette mounting portion 61 on which the cassette 10 is mounted, and a conveyor means 62 which takes out the stimulable phosphor sheet 1 from the cassette 10 mounted on the cassette mounting portion 61 and conveys the stimulable phosphor sheet 1 to the read-out position on the fixing table 31.

The operation of the radiation image read-out apparatus 100 of this embodiment will be described, hereinbelow.

When the cassette 10 is mounted on the cassette mounting portion 61 of the radiation image read-out apparatus 100, the stimulable phosphor sheet 1 is taken out from the cassette 10 and conveyed to the read-out position by the conveyor means 62.

In the read-out position, the stimulable phosphor sheet 1 is fixed to the fixing table 31 under the suction force supplied from the suction pump 32.

The radiation image recorded on the stimulable phosphor sheet 1 is read out by projecting the stimulating light emitted from the stimulating light projecting means 50 onto the stimulable phosphor sheet 1 fixed in the read-out position and detecting by the line sensor 20 stimulated emission emitted from the stimulable phosphor sheet 1 upon exposure to the stimulating light while moving the stimulating light projecting means 50 and the line sensor 20 relatively to the fixed stimulable phosphor sheet 1.

That is, the movable table 42 on which the stimulating light projecting means 50 and the line sensor 20 are mounted is moved along the guide rail 36 by the drive means (not shown), and while being moved along the guide rail 36 on the movable table 42, the stimulating light projection means 50 projects the stimulating light onto the stimulable phosphor sheet 1 and the line sensor 20 detects stimulated emission emitted from the area of the stimulable phosphor sheet 1 exposed to the stimulating light. In this embodiment, the line sensor 20 directly receives the stimulated emission from the stimulable phosphor sheet 1 without an imaging optical system intervening therebetween.

After the radiation image recorded on the stimulable phosphor sheet 1 is read out, the movable table 42 is moved to the upper or lower end of the guide rail 43 and the erasing light projecting means 60 projects the erasing light onto the stimulable phosphor sheet 1 to erase the residual energy of radiation in the stimulable phosphor sheet 1 so that the stimulable phosphor sheet 1 becomes reusable.

Figure 3:
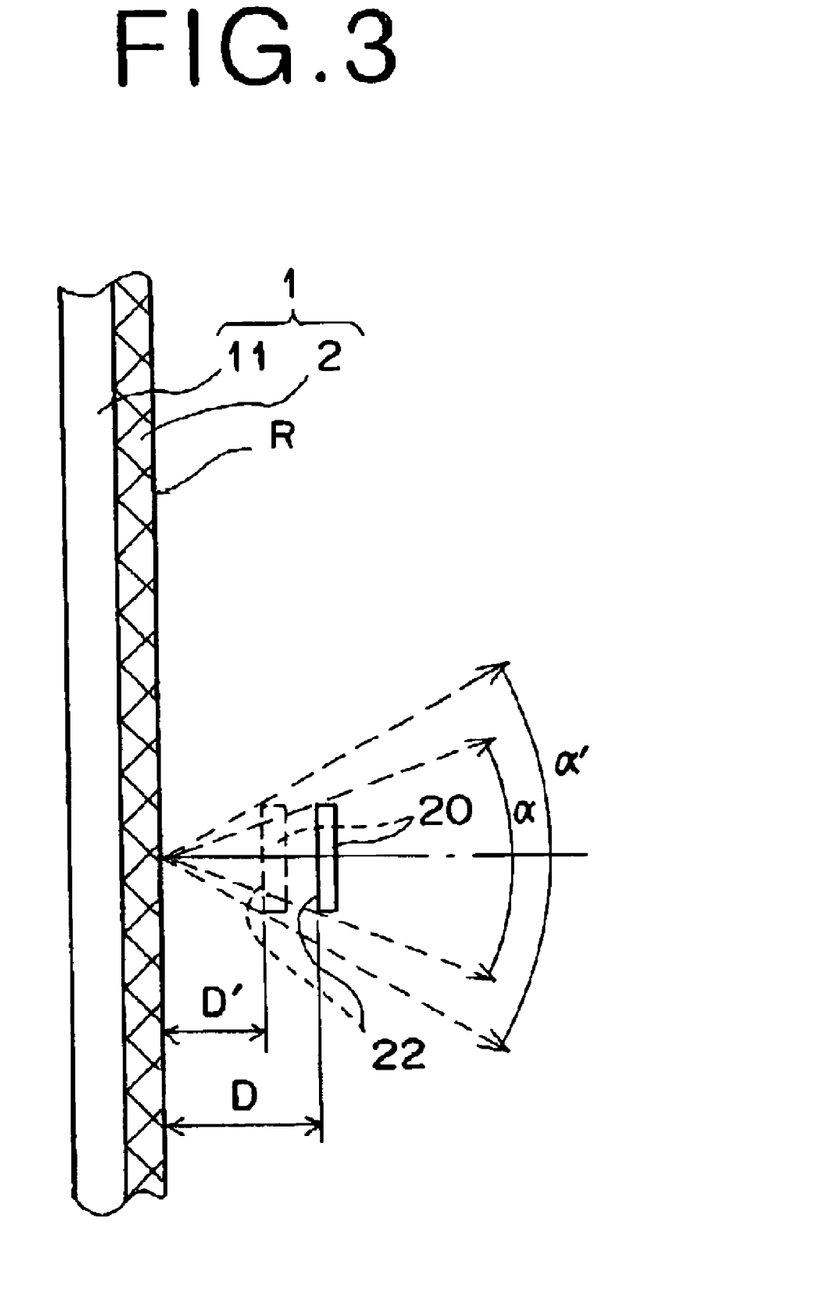
FIG. 3 is a view showing the detecting space.

As shown in FIG. 3, as the detecting space (the distance between the detecting surface R of the stimulable phosphor sheet 1 and the light receiving face 22 of the line sensor 20 upon detection of the stimulated emission) D is made smaller (e.g., to D') so that the angle α of the light bundle impinging upon the light receiving face 22 becomes smaller (e.g., to α'), a larger amount of stimulated emission can be led to the line sensor 22 and at the same time, the resolving power at which areas on the stimulable phosphor sheet 1 is detected can be enhanced, whereby quality of the radiation image information obtained from the stimulable phosphor sheet 1 can be improved. It is preferred that the detecting space D be in the range of 100 μm to 300 μm in view of the flatness of the detecting surface R of the stimulable phosphor sheet 1 and the accuracy of moving the movable table 42.

Though, in the sheet fixing means 30 employed in this embodiment, the stimulable phosphor sheet 1 is fixed in the read-out position by attracting it against the fixing table 31 under suction force, the stimulable phosphor sheet 1 may be fixed in the read-out position, for instance, by clamping the opposite sides thereof at its edge portion by a clamp mechanism. When the stimulable phosphor sheet 1 is fixed at its edge portion, projection of the stimulating light onto the stimulable phosphor sheet 1 by the stimulating light projecting means 50, detection of the stimulated emission by the line sensor 20, and projection of erasing light by the erasing light projecting means 60 need not be carried out from one side of the stimulable phosphor sheet 1.

Figure 4:
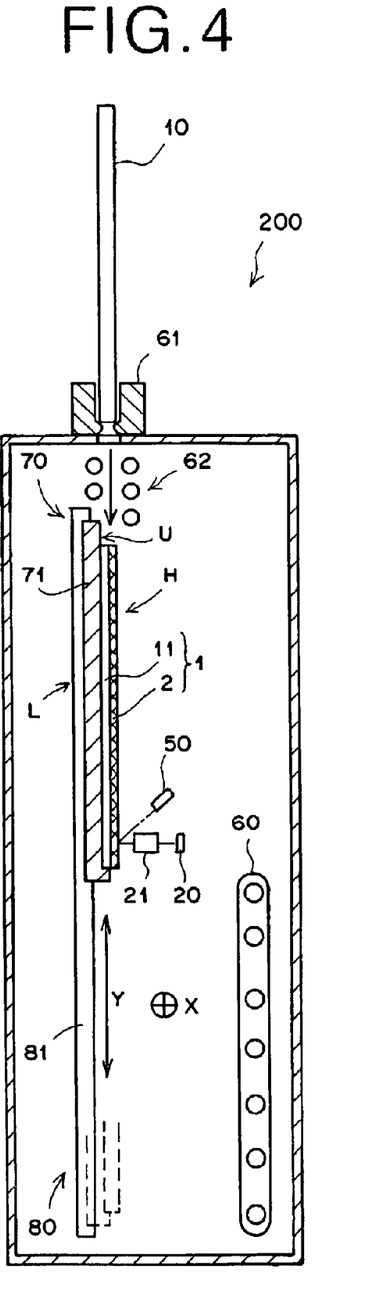
FIG. 4 is a cross-sectional view schematically showing a radiation image read-out apparatus in accordance with a second embodiment of the present invention.

A radiation image read-out apparatus in accordance with a second embodiment of the present invention will be described with reference to FIG. 4, hereinbelow. The radiation image read-out apparatus 200 of the second embodiment differs from that 100 of the first embodiment in that a stimulable phosphor sheet locating means which locates the stimulable phosphor sheet in the direction of its thickness by the use of one side thereof is provided, projection of the stimulating light onto the stimulable phosphor sheet 1 by the stimulating light projecting means, detection of the stimulated emission by the line sensor, and projection of erasing light by the erasing light projecting means are carried out from the other side of the stimulable phosphor sheet, and the line sensor detects the stimulated emission by way of an imaging optical system. In the second embodiment, the elements analogous to those in the first embodiment are given the same reference numerals and will not be described here.

The radiation image read-out apparatus 200 of this embodiment comprises a sheet locating means 70 which locates the stimulable phosphor sheet 1 in the direction of its thickness by locating the rear side L of the stimulable phosphor sheet 1, a sheet conveyor means 80 which moves the stimulable phosphor sheet 1 as located in the direction of its thickness by the sheet locating means 70 relatively to the line sensor 20, and an imaging optical system 21 which forms an image of stimulated emission emitted from the stimulable phosphor sheet 1 through the front side H thereof upon exposure to the stimulating light. The imaging optical system 21 may comprise, for instance, a refractive index distribution type lens array extending in the main scanning direction.

The sheet locating means 70 comprises a locator table 71 which is in the form of a flat metal plate which can be electrically magnetized and demagnetized in response to switching of a switch.

The sheet conveyor means 80 comprises a guide rail 81 along which the locator table 71 is moved in the sub-scanning direction by a drive means (not shown) which may comprise a ball screw.

The support plate 11 of the stimulable phosphor sheet 1 is formed of magnetic material.

The operation of the radiation image read-out apparatus 200 of this embodiment will be described, hereinbelow.

When the cassette 10 is mounted on the cassette mounting portion 61 of the radiation image read-out apparatus 200, the stimulable phosphor sheet 1 is taken out from the cassette 10 and conveyed to the read-out position on the locator table 71 by the conveyor means 62.

Then the locator table 71 is magnetized and the support plate 11 of the stimulable phosphor sheet 1 is attracted to the locator table 71 under the magnetic force, whereby the entire area of the support plate 11 (the rear side L of the stimulable phosphor sheet 1) is brought into close contact with the locating surface U of the locator table 71 and thus the stimulable phosphor sheet 1 is located in the direction of its thickness.

The radiation image recorded on the stimulable phosphor sheet 1 is read out by projecting, from the front side H of the stimulable phosphor sheet 1, the stimulating light emitted from the stimulating light projecting means 50 onto the stimulable phosphor sheet 1 thus located in the direction of its thickness and detecting by the line sensor 20 stimulated emission emitted from the stimulable phosphor sheet 1 upon exposure to the stimulating light from the front side H of the stimulable phosphor sheet 1.

That is, the locator table 71 on which the stimulable phosphor sheet 1 is located is moved along the guide rail 81 by the drive means (not shown), and while the stimulable phosphor sheet 1 being moved along the guide rail 81 on the locator table 71, the stimulating light projection means 50 projects the line-like stimulating light onto the stimulable phosphor sheet 1 and an image of stimulated emission emitted from the line-like area of the stimulable phosphor sheet 1 exposed to the stimulating light is formed on the line sensor 20 by the imaging optical system 21. Thus, the line sensor 20 detects the stimulated emission from the stimulable phosphor sheet 1 by way of the imaging optical system 21.

After the radiation image recorded on the stimulable phosphor sheet 1 is read out, the erasing light projecting means 60 projects the erasing light onto the stimulable phosphor sheet 1 to erase the residual energy of radiation in the stimulable phosphor sheet 1 so that the stimulable phosphor sheet 1 becomes reusable.

Though, in the second embodiment, the stimulable phosphor sheet 1 is moved relatively to the line sensor 20 by moving the locator table 71 by the sheet conveyor means 80 with the line sensor 20 and the stimulating light projecting means 50 held stationary, the stimulating light projecting means 50 and the line sensor 20 may be moved with the stimulable phosphor sheet 1 held stationary.

The present invention may also be applied to a radiation image recording and read-out apparatus where a radiation image is recorded on a stimulable phosphor sheet built therein and the radiation image recorded on the built-in stimulable phosphor sheet 1 is read out.

Further, though held vertically in the embodiments described above when the radiation image recorded thereon is read out, the stimulable phosphor sheet 1 need not be held vertically but may be held, for instance, horizontally.

Further, though, in the first embodiment, the radiation image recorded on the stimulable phosphor sheet 1 is read out with the line sensor held in the vicinity of the stimulable phosphor sheet 1, the radiation image may be read out by way of an imaging optical system intervening between the stimulable phosphor sheet 1 and the line sensor 20.

Further, though, in the second embodiment, the radiation image recorded on the stimulable phosphor sheet 1 is read out by way of an imaging optical system 21 intervening between the stimulable phosphor sheet 1and the line sensor 20, the radiation image may be read out with the line sensor held in the vicinity of the stimulable phosphor sheet 1.

What is claimed is:

1. A radiation image read-out method of reading out a radiation image recorded on a stimulable phosphor sheet in which stimulating light is projected by a stimulating light projecting means onto the stimulable phosphor sheet to expose a linear portion of the stimulable phosphor sheet extending in a main scanning direction to the stimulating light and stimulated emission emitted from the stimulable phosphor sheet upon exposure to the stimulating light is detected by a line sensor extending in the main scanning direction with an imaging optical system intervening between the stimulable phosphor sheet and the line sensor or with the line sensor held in the vicinity of the stimulable phosphor sheet, wherein the improvement comprises that the stimulable phosphor sheet is fixed in a read-out position, and said radiation image is read out while the stimulating light projecting means and the line sensor are being moved relatively to the fixed stimulable phosphor sheet in a sub-scanning direction intersecting the main scanning direction, wherein the stimulating light projecting means projects the stimulating light having a linear beam shape extending in the main scanning direction.

2. A radiation image read-out method of reading out a radiation image recorded on a stimulable phosphor sheet in which stimulating light is projected by a stimulating light projecting means onto the stimulable phosphor sheet to expose a linear portion of the stimulable phosphor sheet extending in a main scanning direction to the stimulating light and stimulated emission emitted from the stimulable phosphor sheet upon exposure to the stimulating light is detected by a line sensor extending in the main scanning direction with an imaging optical system intervening between the stimulable phosphor sheet and the line sensor or with the line sensor held in the vicinity of the stimulable phosphor sheet, wherein the improvement comprises that the stimulable phosphor sheet is fixed in a read-out position, and said radiation image is read out while the stimulating light projecting means and the line sensor are being moved relatively to the fixed stimulable phosphor sheet in a sub-scanning direction intersecting the main scanning direction, wherein the stimulating light projecting means projects the stimulating light having a linear cross sectional beam shape.

3. A radiation image read-out method of reading out a radiation image recorded on a stimulable phosphor sheet in which stimulating light is projected by a stimulating light projecting means onto the stimulable phosphor sheet to expose a linear portion of the stimulable phosphor sheet extending in a main scanning direction to the stimulating light and stimulated emission emitted from the stimulable phosphor sheet upon exposure to the stimulating light is detected by a line sensor extending in the main scanning direction with an imaging optical system intervening between the stimulable phosphor sheet and the line sensor or with the line sensor held in the vicinity of the stimulable phosphor sheet, wherein the improvement comprises that the stimulable phosphor sheet is fixed in a read-out position, and said radiation image is read out while the stimulating light projecting means and the line sensor are being moved relatively to the fixed stimulable phosphor sheet in a sub-scanning direction intersecting the main scanning direction, wherein the line sensor comprises a plurality of photoelectric convertor elements arranged in a row along the main scanning direction.

4. A radiation image read-out method of reading out a radiation image recorded on a stimulable phosphor sheet in which stimulating light is projected by a stimulating light projecting means onto the stimulable phosphor sheet to expose a linear portion of the stimulable phosphor sheet extending in a main scanning direction to the stimulating light and stimulated emission emitted from the stimulable phosphor sheet upon exposure to the stimulating light is detected by a line sensor extending in the main scanning direction with an imaging optical system intervening between the stimulable phosphor sheet and the line sensor or with the line sensor held in the vicinity of the stimulable phosphor sheet, wherein the improvement comprises that the stimulable phosphor sheet is located in the direction of its thickness by the use of one side thereof, and projection of the stimulating light onto the stimulable phosphor sheet, dection of the stimulated emission by the line sensor, and projection of erasing light for erasing the residual energy of the radiation in the stimulable phosphor sheet onto the stimulable phosphor sheet are carried out from the other side of the stimulable phosphor sheet, wherein the stimulable phosphor sheet is supported only at the one side thereof and the one side is opposite to the other side.

5. A radiation image read-out apparatus for reading out a radiation image recorded on a stimulable phosphor sheet comprising a stimulating light projecting means which projects stimulating light onto the stimulable phosphor sheet to expose a linear portion of the stimulable phosphor sheet extending in a main scanning direction to the stimulating light and a line sensor which extends in the main scanning direction and detects stimulated emission emitted from the stimulable phosphor sheet upon exposure to the stimulating light with an imaging optical system intervening between the stimulable phosphor sheet and the line sensor or with the line sensor held in the vicinity of the stimulable phosphor sheet, wherein the improvement comprises a fixing means which fixes the stimulable phosphor sheet 15 in a read-out position, and a moving means which moves the stimulating light projecting means and the line sensor relatively to the fixed stimulable phosphor sheet in a sub-scanning direction intersecting the main scanning direction, wherein the stimulating light projecting means projects the stimulating light having a linear beam shape extending in the main scanning direction.

6. A radiation image read-out apparatus for reading out a radiation image recorded on a stimulable phosphor sheet comprising a stimulating light projecting means which projects stimulating light onto the stimulable phosphor sheet to expose a linear portion of the stimulable phosphor sheet extending in a main scanning direction to the stimulating light and a line sensor which extends in the main scanning direction and detects stimulated emission emitted from the stimulable phosphor sheet upon exposure to the stimulating light with an imaging optical system intervening between the stimulable phosphor sheet and the line sensor or with the line sensor held in the vicinity of the stimulable phosphor sheet, wherein the improvement comprises a fixing means which fixes the stimulable phosphor sheet 15 in a read-out position, and a moving means which moves the stimulating light projecting means and the line sensor relatively to the fixed stimulable phosphor sheet in a sub-scanning direction intersecting the main scanning direction, wherein the line sensor comprises a plurality of photoelectric convertor elements arranged in a row along the main scanning direction.

7. A radiation image read-out apparatus for reading out a radiation image recorded on a stimulable phosphor sheet comprising a stimulating light projecting means which projects stimulating light onto the stimulable phosphor sheet to expose a linear portion of the stimulable phosphor sheet extending in a main scanning direction to the stimulating light and a line sensor which extends in the main scanning direction and detects stimulated emission emitted from the stimulable phosphor sheet upon exposure to the stimulating light with an imaging optical system intervening between the stimulable phosphor sheet and the line sensor or with the line sensor held in the vicinity of the stimulable phosphor sheet, wherein the improvement comprises an erasing light projecting means which projects erasing light for erasing the residual energy of the radiation in the stimulable phosphor sheet onto the stimulable phosphor sheet, and a stimulable phosphor sheet locating means which locates the stimulable phosphor sheet in the direction of its thickness 25 by the use of one side thereof, the stimulating light projecting a means, the line sensor and the erasing light projecting means being arranged to respectively carry out projection of the stimulating light onto the stimulable phosphor sheet, detection of the stimulated emission, and projection of erasing light onto the stimulable phosphor sheet from the other side of the stimulable phosphor sheet, wherein the stimulable phosphor sheet is supported only at the one side thereof and the one side is opposite to the other side.

* * * * *

UNITED STATES PATENT AND TRADEMARK OFFICE
CERTIFICATE OF CORRECTION

PATENT NO.         : 6,864,499 B2
APPLICATION NO. : 10/194050
DATED              : March 8, 2005
INVENTOR(S)        : Hiroaki Yasuda

It is certified that error appears in the above-identified patent and that said Letters Patent is hereby corrected as shown below:

Column 11, lines 46-47 (claim 5), and column 12, lines 14-15 (claim 6), replace each occurrence of "stimulable phosphor sheet 15" with --stimulable phosphor sheet--.

Column 12, line 42 (claim 7), replace "thickness 25" with --thickness--.

Signed and Sealed this

Third Day of April, 2007

JON W. DUDAS
*Director of the United States Patent and Trademark Office*